(12) United States Patent
Lee et al.

(10) Patent No.: US 11,659,475 B2
(45) Date of Patent: *May 23, 2023

(54) ELECTRONIC APPARATUS AND CONTROL METHOD THEREOF

(71) Applicant: SAMSUNG ELECTRONICS CO., LTD., Suwon-si (KR)

(72) Inventors: Yong-woo Lee, Hwaseong-si (KR); Wha-seob Sim, Hwaseong-si (KR); Chang-heon Yoon, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 39 days.

This patent is subject to a terminal disclaimer.

(21) Appl. No.: 17/328,399

(22) Filed: May 24, 2021

(65) Prior Publication Data

US 2021/0282073 A1    Sep. 9, 2021

Related U.S. Application Data

(63) Continuation of application No. 15/949,716, filed on Apr. 10, 2018.

(30) Foreign Application Priority Data

Apr. 10, 2017    (KR) .................. 10-2017-0046268

(51) Int. Cl.
*H04W 48/08* (2009.01)
*H04W 76/10* (2018.01)
(Continued)

(52) U.S. Cl.
CPC ......... *H04W 48/08* (2013.01); *H04L 12/2803* (2013.01); *H04W 12/06* (2013.01);
(Continued)

(58) Field of Classification Search
None
See application file for complete search history.

(56) References Cited

U.S. PATENT DOCUMENTS 10,028,322 B2    7/2018  Oi et al.
2002/0160837 A1  10/2002  Matsuno et al.
(Continued)

FOREIGN PATENT DOCUMENTS

WO    2016/122240 A1    8/2016
WO    2017052162 A1     3/2017
WO    2018132125 A1     7/2018

OTHER PUBLICATIONS

Communication dated Jan. 27, 2022 by the Korean Intellectual Property Office in Korean Patent Application No. 10-2017-0046268.

(Continued)

*Primary Examiner* — Robert M Morlan
(74) *Attorney, Agent, or Firm* — Sughrue Mion, PLLC

(57) ABSTRACT

An electronic apparatus connectable with a network, includes a communication interface configured to communicate with a first device and a second device; and a processor configured to store network connection setting information of the first device, determine, in response to receiving, from the second device, a signal requesting network connection setting information, whether the second device is capable of using the network connection setting information of the first device, and transmit the stored network connection setting information of the first device to the second device in accordance with a result of the determination.

17 Claims, 15 Drawing Sheets

(51) Int. Cl.
  *H04W 48/16* (2009.01)
  *H04L 12/28* (2006.01)
  *H04W 12/06* (2021.01)
  *H04W 12/50* (2021.01)
  *H04W 4/80* (2018.01)
  *H04W 8/00* (2009.01)
  *H04W 48/14* (2009.01)

(52) U.S. Cl.
  CPC ........... *H04W 12/50* (2021.01); *H04W 48/16* (2013.01); *H04W 76/10* (2018.02); *H04W 4/80* (2018.02); *H04W 8/005* (2013.01); *H04W 48/14* (2013.01)

(56) References Cited

U.S. PATENT DOCUMENTS

| | | |
|---|---|---|
| 2003/0182412 A1 | 9/2003 | Lee et al. |
| 2003/0212802 A1 | 11/2003 | Rector et al. |
| 2004/0073620 A1 | 4/2004 | Roh et al. |
| 2006/0101456 A1 | 5/2006 | Crosier et al. |
| 2009/0327560 A1 | 12/2009 | Yalovsky |
| 2010/0169937 A1 | 7/2010 | Atwal et al. |
| 2012/0239813 A1 | 9/2012 | Seo et al. |
| 2013/0250801 A1 | 9/2013 | Kennedy et al. |
| 2014/0012913 A1 | 1/2014 | Varoglu et al. |
| 2016/0198397 A1 | 7/2016 | Lee et al. |
| 2016/0234678 A1 | 8/2016 | Baum |
| 2017/0064238 A1 | 3/2017 | Kardashov |
| 2017/0085698 A1 | 3/2017 | Lee et al. |
| 2018/0359696 A1* | 12/2018 | Borean ................ H04L 67/025 |

OTHER PUBLICATIONS

Communication dated Nov. 15, 2019, from the European Patent Office in counterpart European Application No. 18784729.8.
International Report (PCT/ISA/210) dated Jul. 31, 2018, issued by the International Searching Authority in counterpart International Patent Application No. PCT/KR2018/003839.
Written Opinion (PCT/ISA/237) dated Jul. 31, 2018, issued by the International Searching Authority in counterpart International Patent Application No. PCT/KR2018/003839.

* cited by examiner

ELECTRONIC APPARATUS AND CONTROL METHOD THEREOF

CROSS-REFERENCE TO RELATED APPLICATION

This application is based on a continuation of U.S. application Ser. No. 15/949,716, filed Apr. 10, 2018, which claims priority under 35 U.S.C. § 119 to Korean Patent Application No. 10-2017-0046268, filed on Apr. 10, 2017, in the Korean Intellectual Property Office, the disclosures of which are incorporated by reference herein in their entirety.

BACKGROUND

Field

The disclosure relates to an electronic apparatus and a control method thereof, and more particularly to an electronic apparatus, which is improved in convenience of home network connection settings for a home network device, and a control method thereof.

Description of the Related Art

To incorporate home network devices in a home network, these devices need to be connected to a router of providing the home network. However, the home network device may not be provided with a user interface such as a keyboard or a display. Therefore, it is considerably difficult to connect these devices and the router by a method providing not only convenience but also home network security.

To this end, various methods have been proposed.

First, there is a Wi-Fi protected setup (WPS) method. A push-button-connect (PBC) is a type of the WPS method, in which a user pushes a button with regard to each of the router and the devices to be connected to the router. When the button of the router is pushed, the devices having a WPS function can be freely incorporated into the home network for two minutes. However, this PCB method has a shortcoming of causing a lapse in security. Since all near devices can have access to the router through the WPS function when the router is in a WPS mode, the devices unreliable for a user may access the home network.

Second, there is a Soft access point (AP) method. The home network device is configured by software to serve as a router (i.e., an AP) and connects with a personal computer (PC) or a smart phone. Through the connected PC or smart phone, network initial settings for the home network device are performed. However, it is very difficult for a general user to understand this method because of very complicated procedures. Further, even users who are familiar with control of the network device may find this method difficult. For example, the device is not connected to the home network until a user carries out (1) execution of an application (App), (2) a check of a soft-AP use guide, (3) SoftAP enablement of a home network device, (4) connection to a corresponding wireless AP in the App, (5) password input, (6) a check of the connection, (7) a search for a router to be actually connected, (8) password input, and (9) completion of the connection.

Third, there is a so-called Wi-Fi easy setting method. The device needed for settings of the home network connection is automatically paired with and connected to the smart phone by Bluetooth, and then the network setting information of the smart phone is transmitted to the device by a Bluetooth communication method. However, this method increases production costs of the device since a Bluetooth module is applied to the home network device dedicated for Wi-Fi.

Accordingly, it is required to solve the problems of the foregoing methods.

Furthermore, it is impossible to avoid inconvenience that a user has to do the same network settings every time when each device is connected to the home network since the user makes purchases of the home network devices one by one over a period of time. Accordingly, it is also required to solve this problem.

SUMMARY

In accordance with an aspect of the disclosure, there is provided technology of easily connecting a home network device to a home network while securing security of the home network.

In accordance with another aspect of the disclosure, there is provided technology of facilitating settings of a device to be subsequently connected to the home network based on the network connection setting information of one home network device that has ever been connected to the home network.

Additional aspects will be set forth in part in the description which follows and, in part, will be apparent from the description, or may be learned by practice of the presented embodiments.

According to an embodiment, there is provided an electronic apparatus connectable with a network, comprising: a communication interface configured to communicate with a first device and a second device; and a processor configured to: store network connection setting information of the first device, determine whether the second device is a device capable of using the network connection setting information of the first device in response to receiving, from the second device, a signal requesting network connection setting information, and transmit the stored network connection setting information of the first device to the second device in accordance with the determination.

The second device can be easily connected to the network with the minimum intervention of a user.

The electronic apparatus may further comprise a user input interface configured to receive a user input, wherein the processor determines whether the second device is the device capable of using the network connection setting information of the first device, based on the user input.

The processor may determine whether the second device is the device capable of using the network connection setting information of the first device, in accordance with whether the second device is a device capable of processing network connection settings based on the network connection setting information of the first device.

The processor may detect the second device with which communication is possible, determine whether the second device is the device capable of using the network connection setting information of the first device, and transmit the stored network connection setting information of the first device to the second device in accordance with the determination.

The processor may detect the second device with which communication is possible through at least one of a Bluetooth signal, a ZigBee signal, and an Institute of Electrical and Electronic Engineers (IEEE) 802.11 beacon signal.

The processor may receive the network connection setting information from the first device, and transmit the received connection setting information to the second device.

The processor may transmit a signal, which requests the first device to transmit the network connection setting information of the first device to the second device, to the first device.

Thus, the network connection settings of the second device are rapidly performed since it is possible to directly transmit the network connection setting information from the first device to the second device without an intervention of the electronic apparatus.

The network connection setting information may be provided in an arbitrarily settable portion of a network packet.

Thus, the existing network packet is used to transmit and receive the network connection setting information of the disclosure.

The network connection setting information may comprise at least one of manufacturer information, a version, service providing option information, a packet number, a device type, connection information, a connection type, or an address.

According to an embodiment, there is provided a method of controlling an electronic apparatus capable of communicating with a first device and a second device, the method comprising: storing network connection setting information of the first device whose network connection is completed; receiving, from the second device, a signal of requesting network connection setting information; determining whether the second device is a device capable of using the network connection setting information of the first device; and transmitting the stored network connection setting information of the first device to the second device in accordance with the determination.

The determining may comprise determining whether the second device is the device capable of using the network connection setting information of the first device, based on a user input.

The determining may comprise determining whether the second device is the device capable of using the network connection setting information of the first device, in accordance with whether the second device is a device capable of processing network connection settings based on the network connection setting information of the first device.

The method may further comprise detecting the second device with which communication is possible; determining whether the second device is the device capable of using the network connection setting information of the first device; and transmitting the stored network connection setting information of the first device to the second device in accordance with the determination.

The detecting may comprise detecting the second device with which communication is possible through at least one of a Bluetooth signal, a ZigBee signal, and IEEE 802.11 beacon signal.

Thus, the second device is easily connected to the network without separately making the request for the network connection setting information signal.

The method may further comprise: receiving the network connection setting information from the first device; and transmitting the received connection setting information to the second device.

The method may further comprise transmitting a signal, which requests the first device to transmit the network connection setting information of the first device to the second device, to the first device.

Thus, the network connection settings of the second device are rapidly performed since it is possible to directly transmit the network connection setting information from the first device to the second device without an intervention of the electronic apparatus.

The network connection setting information may be provided in an arbitrarily settable portion of a network packet.

Thus, the existing network packet is used to transmit and receive the network connection setting information of the disclosure.

The network connection setting information may comprise at least one of manufacturer information, a version, service providing option information, a packet number, a device type, connection information, a connection type, or an address.

According to an aspect of another embodiment, there is provided a computer program product including a computer readable medium having a computer program stored thereon, which, when executed by a computing device, causes the computing device to execute the control method of the electronic apparatus, as described above.

The computer program may be stored in the computer readable storage medium in a server and wherein the computer program is downloaded over a network to the computing device.

According to another embodiment, there is provided an electronic apparatus connectable with a network, comprising: a communication interface configured to communicate with a first device and a second device; and a processor configured to: store network connection setting information of the first device, determine, in response to receiving, from the second device, a signal requesting network connection setting information whether the second device is capable of using the network connection setting information of the first device, and transmit the stored network connection setting information of the first device to the second device in accordance with the determination.

According to another embodiment, a method of controlling an electronic apparatus capable of communicating with a first device and a second device, the method comprising: storing network connection setting information of the first device; receiving, from the second device, a signal of requesting network connection setting information; determining whether the second device is capable of using the network connection setting information of the first device; and transmitting the stored network connection setting information of the first device to the second device in accordance with the determination.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION OF EMBODIMENTS

Below, embodiments will be described in more detail with reference to accompanying drawings. However, the structures and functions illustrated in the following embodiments are not construed as limiting the present inventive concept and the key structures and functions. In the following descriptions, detailed descriptions about publicly known functions or elements may be omitted in the following description and accompanying drawings if it is determined that they cloud the gist of the present inventive concept.

In the following embodiments, terms including ordinal numbers such as first, second and the like are employed just for distinguishing between one element and another element. Further, a singular expression may involve a plural expression as long as it does not clearly give different meaning contextually. In the following descriptions, terms such as 'comprise', 'include' or 'have' do not exclude presence or addition of one or more other features, numbers, steps, operations, elements, components or combination thereof. In addition, a 'module' or a 'portion' may perform at least one function or operation, be achieved by hardware or software or combination of hardware and software, and a plurality of 'modules' or a plurality of 'portions' may be modularized into at least one processor. As used herein, expressions such as "at least one of" or "at least one from among," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c. As used herein, the terms "first" and "second" may use corresponding components regardless of importance or order and are used to distinguish one component from another without limiting the components.

This disclosure relates to an electronic apparatus, which is improved in convenience of network connection settings for home network devices in a home network system, and a control method thereof, and a home network device. Below, the home network system according to the disclosure will be described with reference to FIG. 1.

Figure 1:
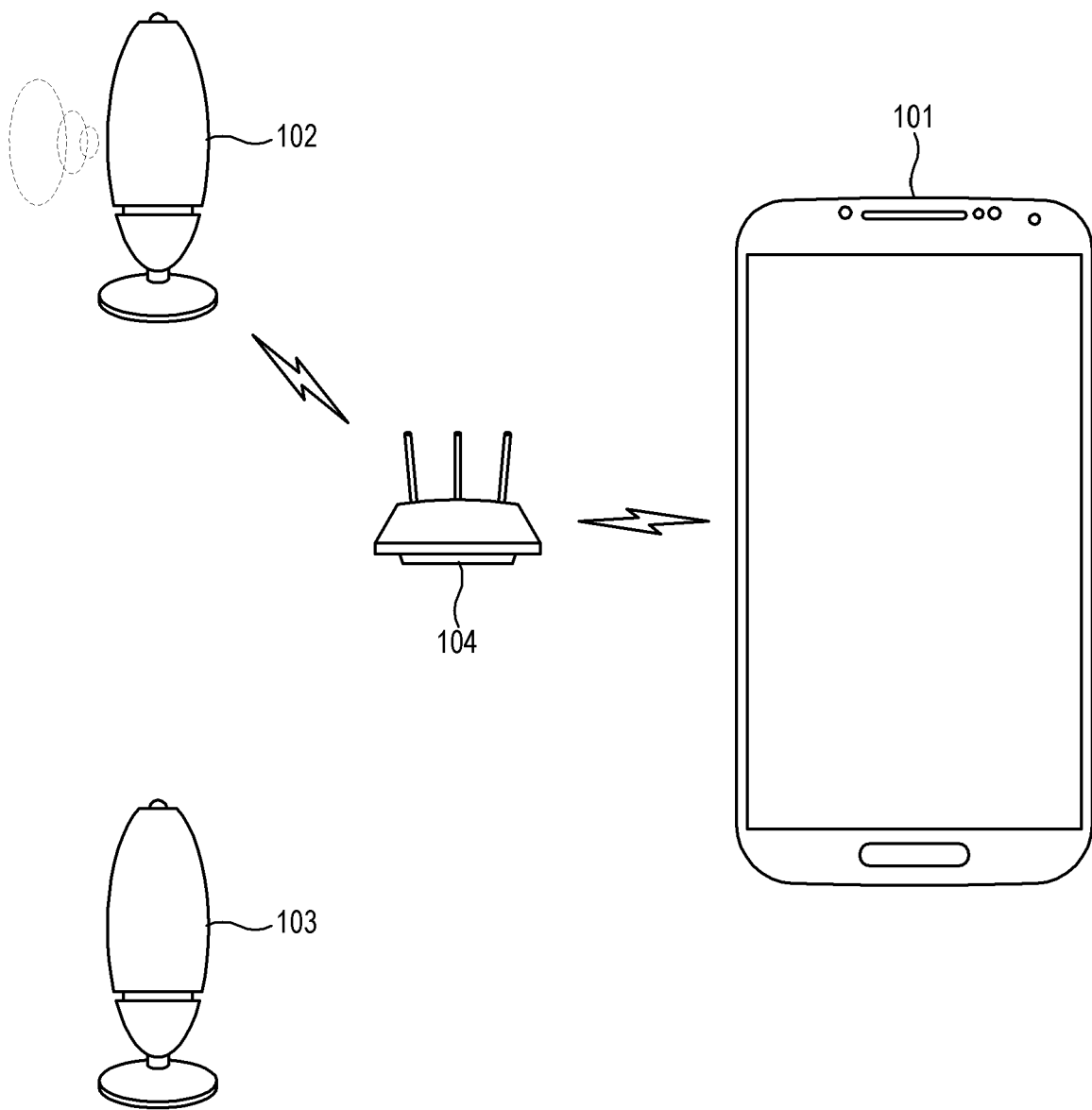
FIG. 1 is a view of showing a home network system according to an embodiment of the disclosure.

As shown in FIG. 1, the home network system according to an embodiment includes an electronic apparatus 101, home network devices 102 and 103, and a router 104 enabling the apparatus and the devices to communicate with one another to thereby establish a home network.

FIG. 1 illustrates a smart phone as the electronic apparatus 101, but the electronic apparatus 101 according to the disclosure is not limited to the smart phone. Besides the smart phone, the electronic apparatus 101 according to the disclosure may include a television (TV), a tablet computer, a notebook computer, a personal computer (PC), a personal digital assistant (PDA), a portable multimedia player (PMP), a smart watch, a wearable device, and the like display apparatus. However, the electronic apparatus 101 according to the disclosure may not necessarily include a display as long as the electronic apparatus has a communication function.

According to the disclosure, loudspeakers are illustrated as the home network devices 102 and 103. However, there are no limits to the home network devices 102 and 103. The home network devices 102 and 103 may include any electronic devices that support a network. For example, a smart TV, a refrigerator, a washing machine, a cleaner, an oven, a network audio system, an artificial intelligent home appliance, a wearable device, etc.

FIG. 1 illustrates that one device 102 (hereinafter, referred to as a 'first device') of the home network devices has already been connected to the home network and is operating, and another home network device 103 (hereinafter, referred to as a 'second device') is going to connect with the home network. Referring to FIG. 1, both the first device 102 and the second device 103 are of the same kind, i.e. the loudspeakers. However, even though the first device 102 and the second device 103 are different in kind from each other, this disclosure is applicable as long as the second device 103 is capable of processing the network connection settings based on the connection setting information of the first device 102. Further, unlike that the first device 102 has already been connected to the home network as shown in FIG. 1, this disclosure is applicable even when any home network device is not connected to the home network and when one or more home network devices have already been connected the home network.

The router 104 is illustrated in FIG. 1 as a wireless local area network (WLAN) or a Wi-Fi router. However, the router 104 according to the disclosure may include any device without limitations to its kind and name as long as it can make the electronic apparatus 101 and the home network devices 102 and 103 communicate with one another. The communication for the home network is broadly divided according to wired technology and wireless technology. The communication based on the wired technology includes methods using a telephone line, a power line, Ethernet, IEEE 1394, a universal serial bus (USB), etc. The communication based on the wireless technology includes methods such as IEEE 802.11x WLAN, HomeRF, Bluetooth, ultrawideband (UWB) communication, Zigbee, HiperLAN, etc. The electronic apparatus 101 and the home network devices 102 and 103 may be connected in an ad-hoc mode or an infrastructure mode using the router 104. For convenience of description, the disclosure will be described under conditions that IEEE 802.11x WLAN communication is selected as a communication method for the home network, and a WLAN access point (AP) is used as the router 104.

Below, elements and operations the electronic apparatus according to the disclosure will be described with reference to FIG. 1.

Figure 2:
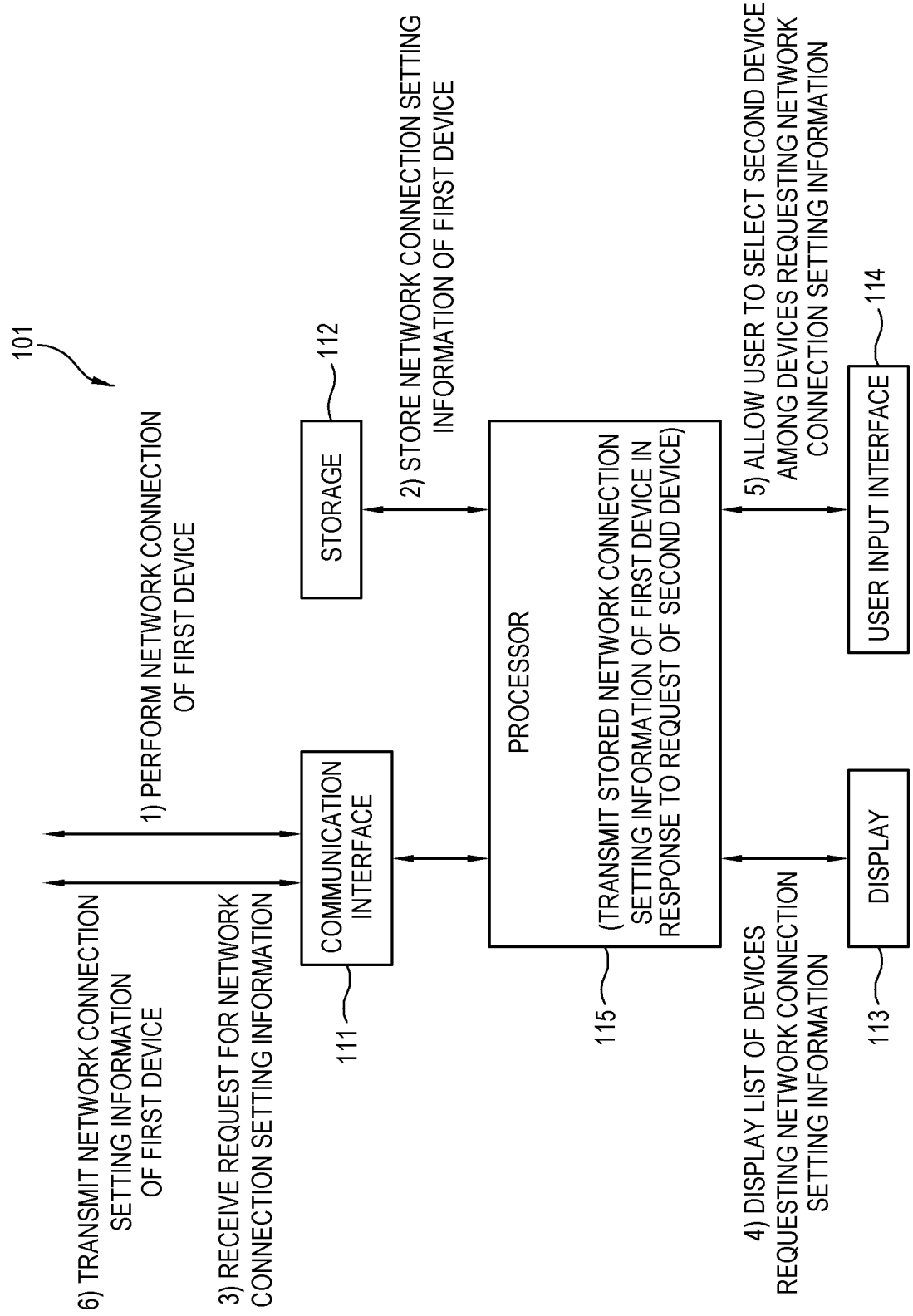
FIG. 2 is a block diagram of showing elements and operations of an electronic apparatus according to an embodiment.

FIG. 2 is a block diagram of showing elements and operations of an electronic apparatus according to an embodiment. The electronic apparatus 101 includes a communication interface 111 and a processor 115. The electronic apparatus 101 may further include a storage 112, a display 113, and a user input interface 114.

The communication interface 111 may communicate with the router 104 and also communicate with the home network devices 102 and 103 via the router 104. To this end, the communication interface 111 may include at least one among the communication modules based on the foregoing communication methods for the home network. The communication interface 111 may, receive a request for network connection setting information. The communication interface 111 may also transmit network connection setting information of the home network device, i.e. the first device 102. Moreover, the communication interface 111 may perform network connection of the home network device. Further, the communication interface 111 may directly communicate with the home network devices 102 and 103 without the router 104. To this end, the communication interface 111 may include communication modules for Bluetooth low energy (BLE), serial port profile (SPP), Wi-Fi Direct, infrared communication, Zigbee, near field communication (NFC), etc. The communication interface 111 may be embodied in the form of a device, an S/W module, a circuit, a chip, etc.

The storage 112 is configured to store information when it is needed in a procedure for connecting the home network device to the home network. For example, the storage 112 may be configured to store information about the network connection settings of the home network device, i.e. the first device 102. The storage 112 may include a nonvolatile memory such as a flash memory, an EPROM, an EEPROM, etc., and a volatile memory such as a DRAM, an SRAM, etc.

The display 113 may display information on a screen thereof when it is needed in a procedure for connecting the home network device to the home network. For example, when the home network device, i.e. the second device 103 makes a request for the information about the network connection settings, the request and the kind of device that makes the request may be displayed on the screen.

The display 113 may be embodied in various ways. For example, the display 113 may be a liquid crystal display, a plasma display, a light emitting diode display, an organic light emitting diode display, a surface conduction electron emitter display, a carbon nano tube display, a nano crystal display, etc. In case of the liquid crystal display, the display 113 includes a liquid crystal display panel, a backlight unit for emitting light to the liquid crystal display panel, a panel driving board for driving the liquid crystal display panel, etc. The display 113 may also be realized as a self-emissive OLED panel without the backlight unit.

The user input interface 114 may receive a user input when it is needed in a procedure for connecting the home network device to the home network. For example, when the electronic apparatus 101 receives requests for the network connection setting information from a plurality of home network devices, the electronic device 101 displays a list of home network devices that make the requests on the display 113, and then receives a user input of selecting at least one device in the list through the user input interface 114.

The user input interface 114 may be variously embodied in accordance with user input methods. For example, the user input interface 114 may include a keyboard, and a virtual keyboard on a touch screen. Besides, the user input interface 114 may be embodied by a menu button provided on an outer side of the electronic apparatus, a remote control signal receiver for receiving a remote control signal corresponding to a user input from a remote controller, a camera for sensing a user gesture input, a microphone for receiving a user's voice input, etc.

The processor 115 performs processes needed in a procedure for connecting the home network device to the home network, and controls other elements such as the communication interface 111, etc. of the electronic apparatus. For example, the processor 115 may perform a variety of controls and processes needed for the network connection of the first device 102 such as control of the communication interface 111; control the storage 112 to store the information generated about the network connection settings for the first device 102; control the display 113 to display a list of home network devices on the screen thereof when there is a home network device making a request for the network connection setting information; and control the user input interface 114 to receive a user input for selecting at least one in the list. Further, the processor 115 may process the network connection setting information to be transmitted to the corresponding device in response to a request for the network connection setting information.

A component for performing the control in the processor 115 may be provided inside the processor 115, or provided separately from the processor 115. The processor 115 may include a program for performing the control and processing operations, a nonvolatile memory in which the program is installed, a volatile memory to which the installed program is at least partially loaded, and at least one microprocessor or central processing unit (CPU) for executing the loaded program. The program may include a program achieved in the form of at least one among a basic input/output system (BIOS), a device driver, an operating system, a firmware, a platform, and an application program (or application). According to an embodiment, an application program may be previously installed or stored in the electronic apparatus when the electronic apparatus is manufactured, or may be installed in the electronic apparatus based on data of the application program received from the outside in the future when it is used. The data of the application program may be for example downloaded from an external server such as an application market to the electronic apparatus. The processor 115 may be embodied in the form of a device, an S/W module, a circuit, a chip, etc.

Figure 3:
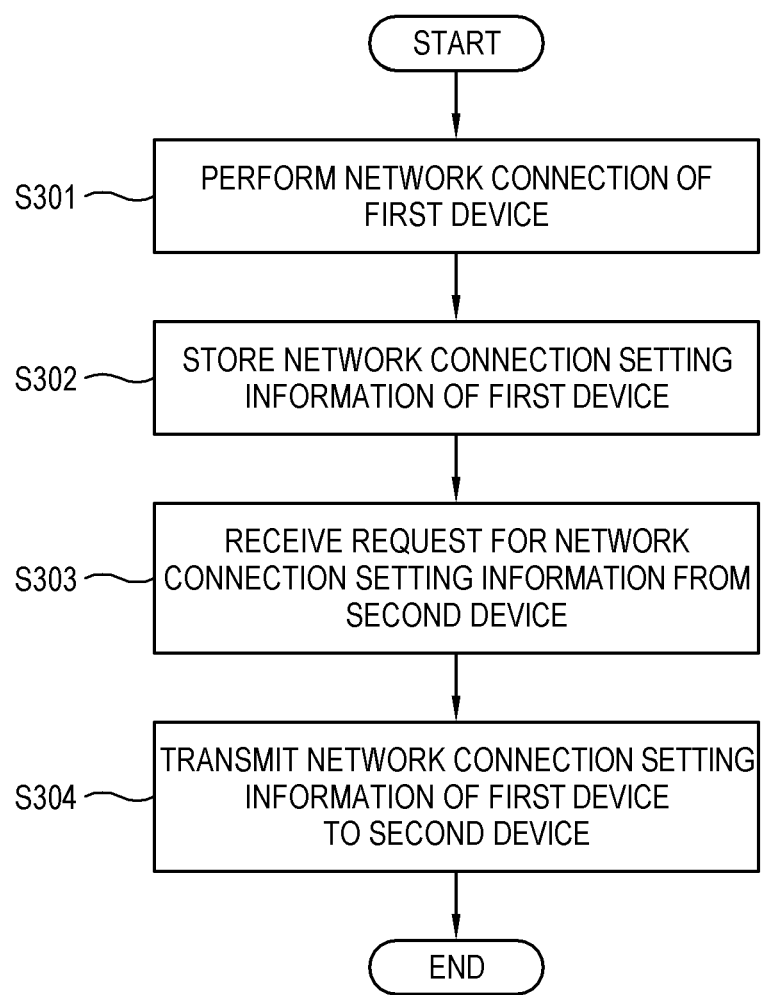
FIG. 3 is a flowchart of showing a control method of an electronic apparatus according to an embodiment.

Below, a method of controlling an electronic apparatus according to an embodiment will be described with reference to FIG. 3.

The electronic apparatus 101 according to an embodiment performs network connection for the first device 102 (S301). As a method for connecting the first device 102 to the home network, one of the conventional methods described in the BACKGROUND may be used, or one of the methods according to the disclosure to be described later may be used.

For example, the network connection for the first device 102 using the conventional method is performed as follows. To connect the device to the home network, a user carries out (1) execution of an application (App) in the electronic apparatus 101, (3) a check of a soft-AP use guide, (3) selection of a Soft-AP enable button for the first device 102, (4) connection to a wireless AP corresponding to the Soft-AP of the first device 102 in the App, (5) password input to the Soft-AP, (6) a check of the connection, (7) a search for a router to connect with the first device 102, (8) password input to the router, and (9) completion of the connection.

Further, one of the following methods according to the disclosure may be also used in connecting the first device 102 to the home network. In this case, a user only has to turn on the first device 102. Then, the electronic apparatus 101 automatically transmits the network connection setting information to the first device 102 in response to a request of the first device 102 for the network connection setting information to the electronic apparatus 101. However, this case is different from the following various embodiments in that home network devices connected to the home network are not present at that time when the home network device, i.e. the first device 102 makes the request for the network connection setting information to the electronic apparatus. Therefore, in this case, the connection setting information about the previously connected home network devices is not present, and it is thus impossible to transmit the connection setting information to the first device 102. Accordingly, the electronic apparatus 101 transmits its own connection setting information about the home network to thereby perform the home network connection for the first device 102.

Here, the network connection setting information refers to setting information for connecting the home network device to the home network, and may for example include service set identifier (SSID), basic service set identifier (BSSID), encryption standards (wired equivalent privacy (WEP), Wi-Fi protected access (WPA), WPA2, etc.), password, a frequency band (2.4 GHz, 5 GHz) when the router 104 of the home network system employs a Wi-Fi communication method. However, the network connection setting information may include any information as long as it is required for having an access to the home network.

The network connection setting information may be provided in an arbitrarily settable portion of a network packet. Thus, the existing network packet may be used to transmit and receive the network connection setting information. Further, the network connection setting information may include at least one among manufacturer information, a version, service providing option information, a packet number, a device type, connection information, a connection type, and an address.

When the network connection for the first device 102 is completed by the foregoing procedure, the electronic apparatus 101 stores the network connection setting information of the first device 102 (S302). However, that the network connection setting information of the first device 102 is stored in the electronic apparatus 101 is just one embodiment, and this embodiment is not construed as limiting the disclosure. For example, the network connection setting information of the first device 102 may be stored in a separate server, or the information stored in the first device 102 may be used as necessary. In this regard, details will be described below with various embodiments.

Then, the electronic apparatus 101 receives a request for the network connection setting information from the second device 103 that is newly going to connect with the home network (S303). Alternatively, the electronic apparatus 101 may directly search for the second device 103, which is connectable but has not been connected yet to the network, among peripheral devices.

The second device 103 may make a request for the network connection setting information when it is turned on for the first time. Also, the second device 103 may check whether the network connection setting information is present therein every time when it is turned on, and makes the request when the network connection setting information is not present. However, there are no limits to the operation of making the request for the network connection setting information. In other words, the request may be made at any time when there is a need of connecting the second device 103 to the home network.

To receive the request for the connection setting information from the second device 103 and the like home network device, the electronic apparatus 101 may be required to execute a separate application. In this case, the electronic apparatus 101 may execute such an application in a background mode so as to receive the request at any time while the electronic apparatus 101 is operating. Further, the request for the network connection setting information may be received after the application is executed in response to a separate user input. By the way, a separate password may be needed or may not be needed for communication between the second device 103 and the electronic apparatus 101.

The electronic apparatus 101, which has received the request for the network connection setting information from the second device 103 desired to connect with the home network, transmits the network connection setting information of the first device to the second device (S304). Then, the second device 103 may be connected to the home network based on the network connection setting information of the first device received from the electronic apparatus 101. Here, there are no limits to a communication method of transmitting the network connection setting information from the electronic apparatus 101 to the second device 103. For example, the WLAN may be used, and a Bluetooth communication module may be also used.

Thus, the second device 103 can be easily connected to the home network with minimum intervention of a user.

Below, operational procedures and flows of the electronic apparatus and the home network system according to various embodiments will be described with reference to FIGS. 4 to 10.

Figure 4:
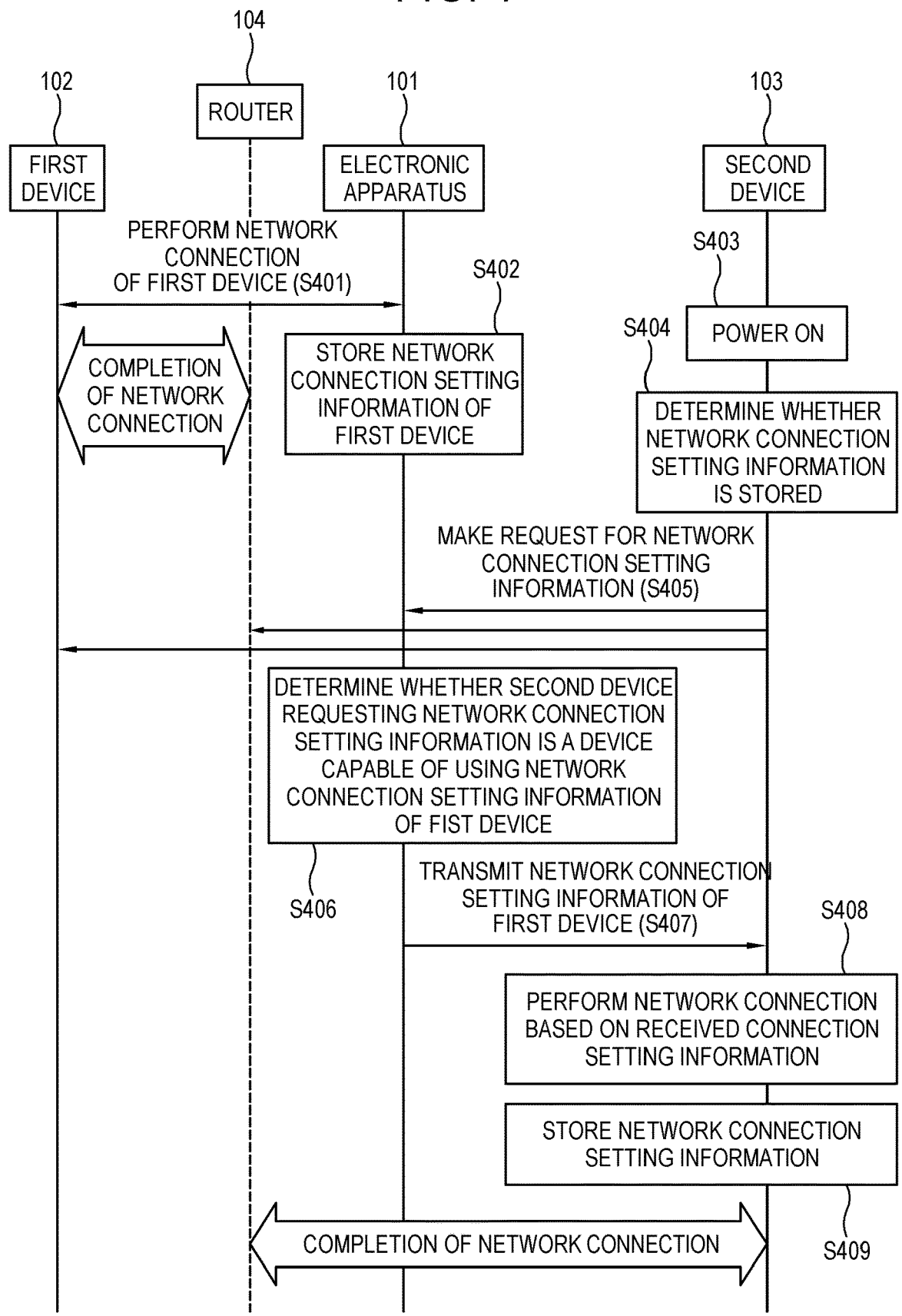
FIGS. 4 and 5 are views of showing operations among an electronic apparatus, a first device, and a second device according to a first embodiment.

FIG. 4 is a view of showing operations among an electronic apparatus, a first device, and a second device according to a first embodiment.

First, the electronic apparatus 101 according to the first embodiment performs network connection for the first device 102 (S401). The method of performing the network connection for the first device 102 is the same as shown in FIG. 3. When the network connection is completed, the network between the first device 102 and the router 104 is established. Thus, the first device 102 is incorporated in the home network to which the electronic apparatus 101 belongs, and therefore communication between them is possible. After the first device 102 is connected to the home network, the network connection setting information of the first device 102 is stored in the storage 112 of the electronic apparatus 101.

When the second device 103 is turned on (S403), it is determined whether or not the network connection setting information is stored in the second device 103 (S404). When the second device 103 has the stored network connection setting information, the second device 103 is connected to the router 104 in accordance with the connection setting information and incorporated into the home network system, thereby performing communication. On the other hand, when the second device 103 does not have the stored network connection setting information, the second device 103 may broadcast a packet of making a request for the network connection setting information to other devices such as the electronic apparatus 101, the first device 102, and the router 104 (S405).

There are no specific limits to the type of packet to be broadcasted for making the request. For example, when the home network system employs an IEEE 802.11x WLAN communication method, a 802.11x packet may be economical since there are no needs of adding a separate communication module. However, if the second device 103 has a communication module in common with another home network device, e.g. the electronic apparatus 101, a packet of a corresponding communication protocol, for example, a Bluetooth packet, a ZigBee packet, etc. may be used.

To indicate that the packet is of making the request for the network connection setting information, this indication may be added as a separate field to a packet header, and corresponding information may be defined and utilized in a space, which can be designated by a manufacturer, within the packet. In terms of utilizing the type of protocol provided corresponding to the communication modules as it is, the latter may be more beneficial.

In case of using the 802.11x packet, a detailed method of broadcasting the request for the network connection setting information may employ a general 802.11x broadcast packet, or employ a 802.11x beacon packet after the second device 103 operates by the SoftAP. When the beacon packet is employed, other home network devices including the electronic apparatus 101 may directly receive and recognize the packet without any separate settings, execution of the application, update of firmware, and the like. On the other hand, when the general broadcast packet is employed, there may be a need of executing a separate application in a receiving apparatus for receiving and recognizing the request, for example, in the electronic apparatus 101 since the second device 103 is not connected to the home network yet. In this case, as described above, the application may be executed as a background in the electronic apparatus 101, or may be executed in response to a user input as necessary. Besides, the request may be transmitted to the electronic apparatus 101 in such a manner that the router 104 receives the request from the second device 103 and then transmit it to the electronic apparatus 101 connected to the home network.

In the foregoing embodiment, the request for the connection setting information is transmitted by determining whether or not the network connection setting information is stored in the second device 103 after the second device 103 is turned on. However, the disclosure is not limited to this embodiment. Alternatively, when the second device 103 is turned on, the request for the connection setting information may be directly transmitted by determining whether the second device 103 is turned on for the first time or not, or the request for the connection setting information may be transmitted in response to a user input to a button or touch sensor separately provided in the second device 103.

The electronic apparatus 101, which has received a packet of making a request for the network connection setting information from the second device 103, determines whether the second device 103 making the request for the network connection setting information is a device approved to use the network connection setting information of the first device 102 (S406). Here, 'the device approved to use the network connection setting information of the first device' refers to a device that has technical possibility of using the connection setting information, i.e. a device capable of completing the connection with the home network based on the connection setting information of the first device. Further, it may further include meaning of qualification or reliability for using the connection setting information. If the connection setting information is provided in response to the request of all the devices connectable to the home network based on the network connection setting information of the first device without verifying the qualification or reliability, a problem may arise in securing the security of the home network.

Figure 5:
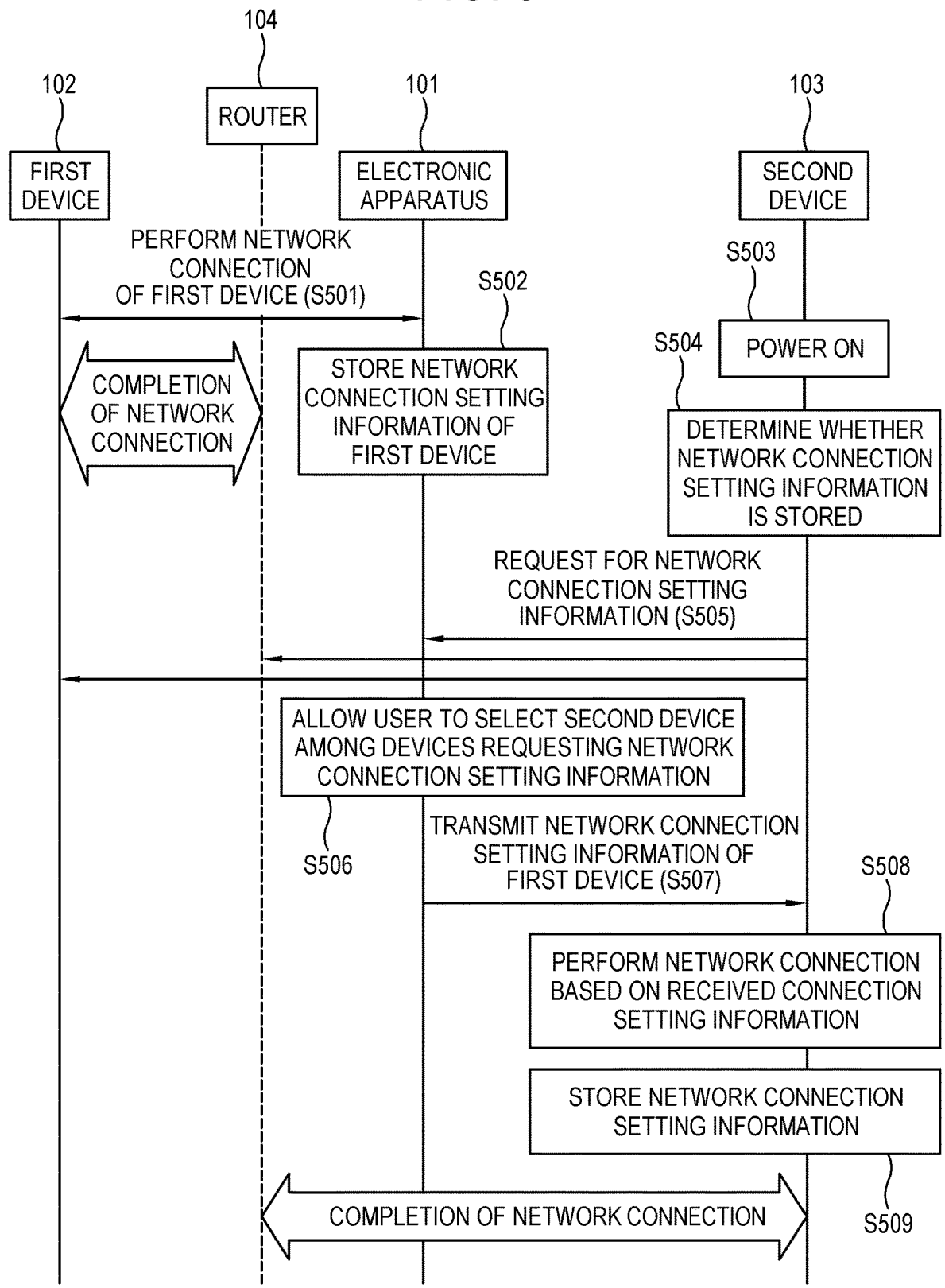

One among methods of verifying the qualification or reliability the connection setting information is to allow a user himself/herself to select the device to which the connection setting information will be provided. In other words, the list of devices making the request for the connection setting information is displayed on the screen of the electronic apparatus 101, and then a user is allowed to select the devices to which the connection setting information will be provided, so that only the devices confirmed by the user can have an access to the home network, thereby maintaining the security. FIG. 5 shows this embodiment, in which a method of allowing a user to select the second device 103 to be approved among the devices that has made the request for the network connection setting information (S506) is illustrated as a detailed method of 'determining whether or not the second device 103 that has made the request for the network connection setting information is the device approved to use the network connection setting information (S406)' of FIG. 4. Thus, a user himself/herself selects and determines the device to which the network connection setting information of the preset first device will be provided, thereby maintaining the security of the home network. In FIG. 5, operations S501 through S505 and S507 through S509 are the same as operations S401 through S405 and S407 through S409 of FIG. 4 so repeated description will be omitted.

However, the method of verifying the qualification and reliability of the device that has made the request for the connection setting information is not limited to the foregoing embodiment, but may be achieved variously. For example, when the second device 103 is of the same type as the first device 102 that has already been connected to the home network, it may be determined that a user buys one more device of the same type and wants to connect it to the home network, thereby granting the request of the second device 103. However, this case may additionally need a operation of securing the security by determining whether the first device 102 has the qualification and reliability to be connected to the home network. When the request of the second device 103 for the network connection setting information is made in response to a user input to the second device 103, for example, when a user pushes a button provided in the second device 103 to make the request for the network connection setting information, a field of indicating such a user input may be provided in a broadcast packet so that the reliability of the request for the network connection setting information can be verified based on the user input.

Through the foregoing procedures, when it is determined that the second device 103 is the device approved to use the network connection setting information of the first device, the electronic apparatus 101 transmits the connection setting information of the first device 102, which has been stored in the storage 112, to the second device 103 (S407). The second device 103, which has received the connection setting information from the electronic apparatus 101, performs connecting with the home network based on the received connection setting information (S408). In result, the second device 103 is also connected to the home network. Further, the second device 103 separately generates and stores the network connection setting information, or stores the received connection setting information therein, and thus does not have to make the request for the network connection setting information repetitively at every time when the second device 103 is turned on (S409).

In the first embodiment described with reference to FIGS. 4 and 5, the second device 103 broadcasts the packet of requesting the network connection setting information to another device. However, the request does not have to be broadcasted. Alternatively, the second device 103 may be directly connected to the electronic apparatus 101 capable of providing the connection setting information so that the request can be transmitted to the electronic apparatus 101.

Figure 6:
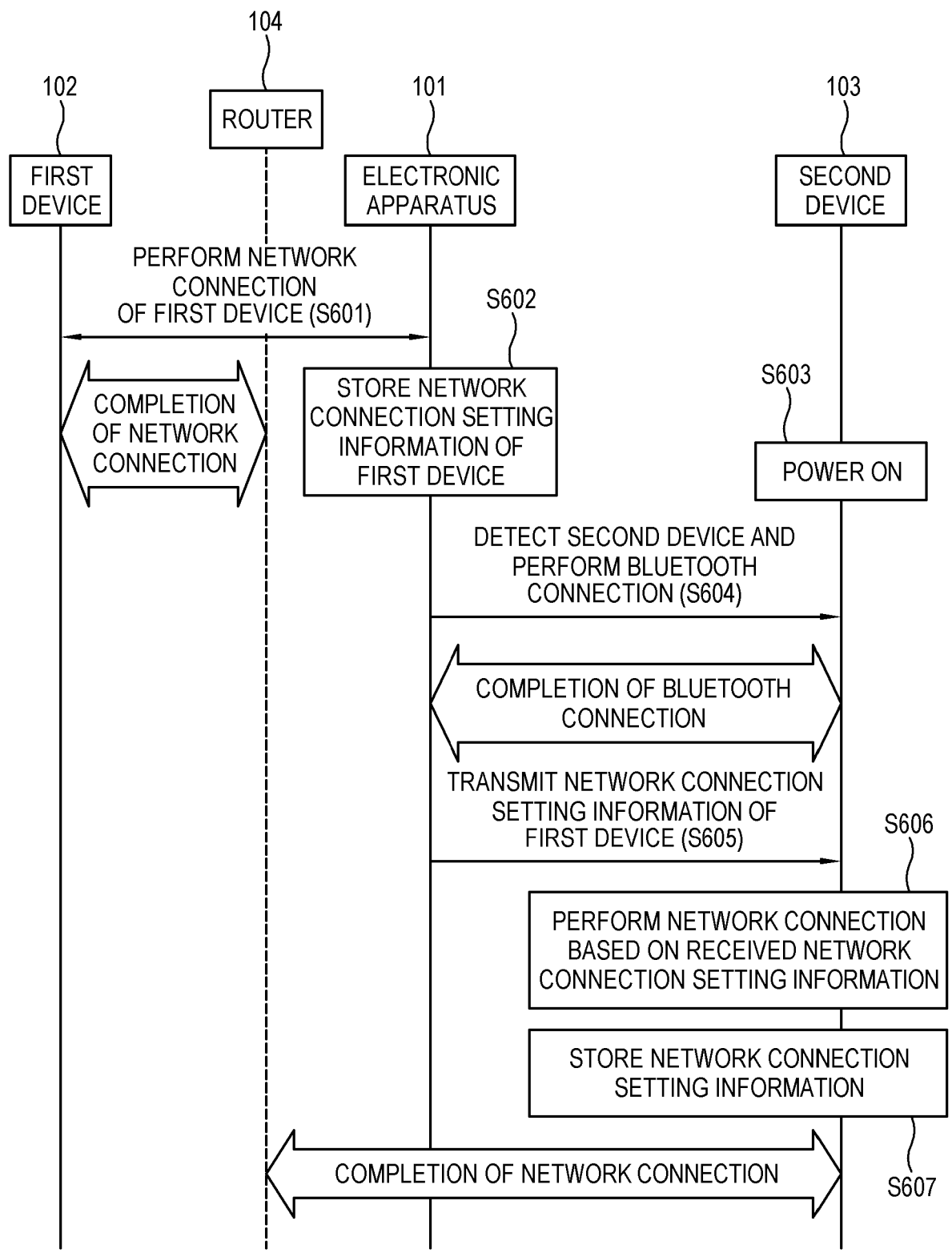
FIG. 6 is a view of showing operations among an electronic apparatus, a first device, and a second device according to a second embodiment.

In this regard, descriptions will be made with reference to FIG. 6. FIG. 6 is a view of showing operations among an electronic apparatus, a first device, and a second device according to a second embodiment.

Operations S601 and S602 between the electronic apparatus 101 and the first device 102, in which the electronic apparatus 101 performs the network connection with the first device 102 and stores the network connection setting information of the first device 102, are the same as operations S401 and S402 described above. Then, when the second device 103 is turned on for the first time (S603), the electronic apparatus 101 detects the second device 103 and connects with the second device 103 for communication (S604). However, it is just one example that the electronic apparatus 101 and the second device 103 are connected when the second device 103 is turned on for the first time. Alternatively, the electronic apparatus 101 and the second device 103 may be connected under other circumstances in which the second device 103 needs the network connection settings.

In this case, the connection between the electronic apparatus 101 and the second device 103 is not limited to a specific communication method. For example, when both the electronic apparatus 101 and the second device 103 respectively include Bluetooth communication modules, they may be connected by Bluetooth pairing. Alternatively, when the electronic apparatus 101 and the second device 103 may include only Wi-Fi communication modules, the electronic apparatus 101 operates by SoftAP and transmits a beacon signal so that the electronic apparatus 101 and the second device 103 can be connected. The electronic apparatus 101 and the second device 103 may be connected by Bluetooth low energy (BLE), serial port profile (SPP), Wi-Fi Direct, infrared communication, near field communication (ZigBee), or a similar communication method.

In these cases, the second device 103 can be connected to and directly communicate with the electronic apparatus 101, and therefore the second device 103 does not have to broadcast a request for network connection setting information like those of FIGS. 4 and 5. That is, the second device 103 can transmit the request to only the electronic apparatus 101. Alternatively, without transmitting the separate request, the second device 103 may send the electronic apparatus 101 a packet embedded with information about a state the second device 103 is in need of the network connection setting information, when the electronic apparatus 101 and the second device 103 are connected. Alternatively, the electronic apparatus 101 connecting with the second device 103 may directly determine whether there is a need of transmitting the network connection setting information to the second device 103 or not, and transmit information even though the second device 103 does not transmit separate information In terms of communication between the electronic apparatus 101 and the second device 103, necessary information such as manufacturer information, a version, corresponding service providing option information, a packet number, a device type, connection information, a connection type, address, etc. may be defined and utilized in accordance with the standards of a manufacturer in a space, which can be designated by the manufacturer, within the packet corresponding to a communication module. For example, when the electronic apparatus 101 and the second device 103 are paired by Bluetooth, a packet of making a request for the network connection setting information, which is transmitted from the second device 103 to the electronic apparatus 101, may employ a Bluetooth advertisement packet and a scan response packet among Bluetooth packets.

With the foregoing procedures, when the electronic apparatus 101 determines that there is a need of receiving the request for the network connection setting information from the second device 103 or providing the network connection setting information to the second device 103, the electronic apparatus 101 transmits the network connection setting information of the first device 102 to the second device 103 (S605). Then, the second device performs the network connection based on the received information (S606) and stores the network connection setting information (S607) by the same procedures as those described in the first embodiment.

Figure 7:
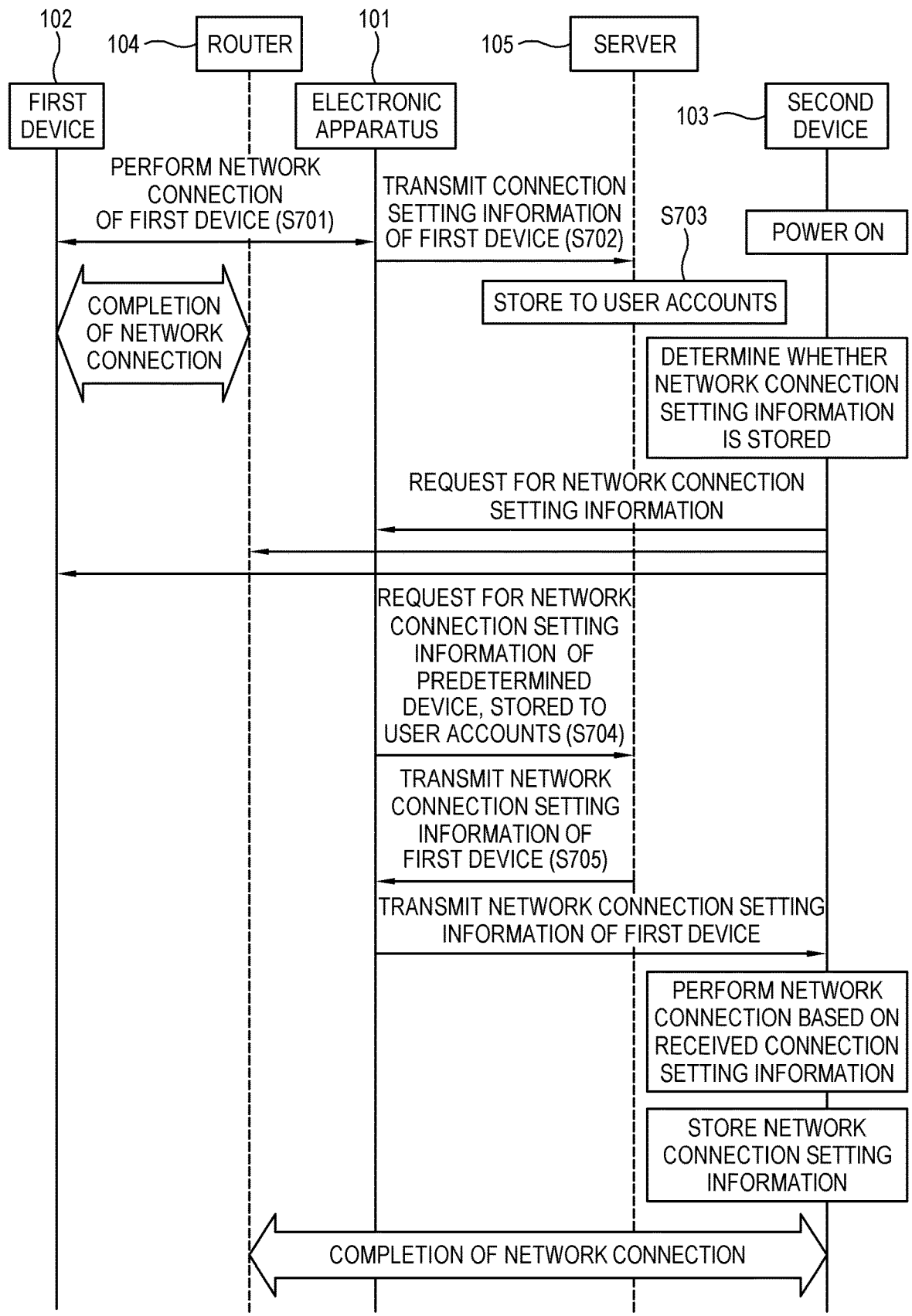
FIG. 7 is a view of showing operations among an electronic apparatus, a first device, and a second device according to a third embodiment.
Figure 8:
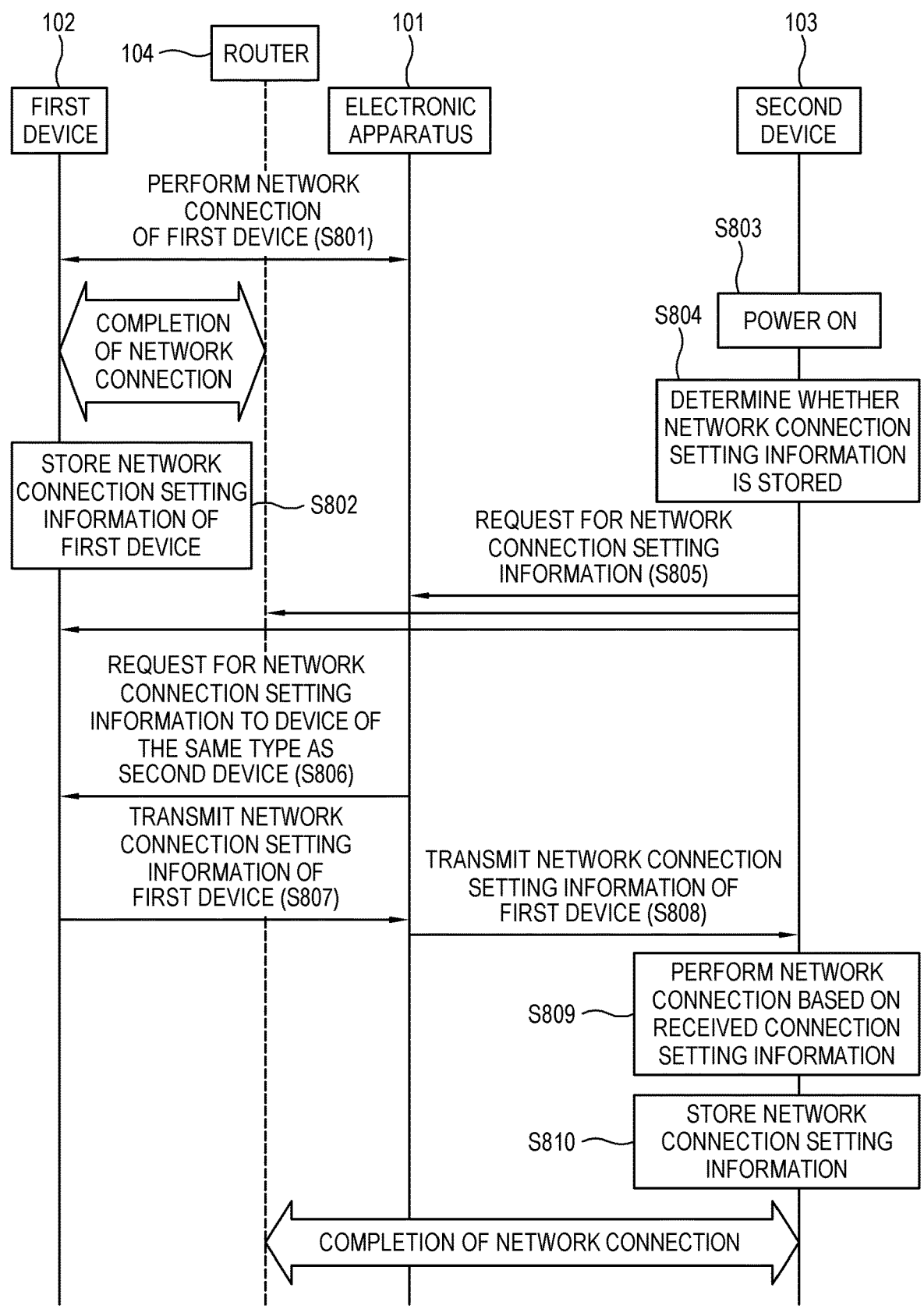
FIG. 8 is a view of showing operations among an electronic apparatus, a first device, and a second device according to a fourth embodiment.
Figure 9:
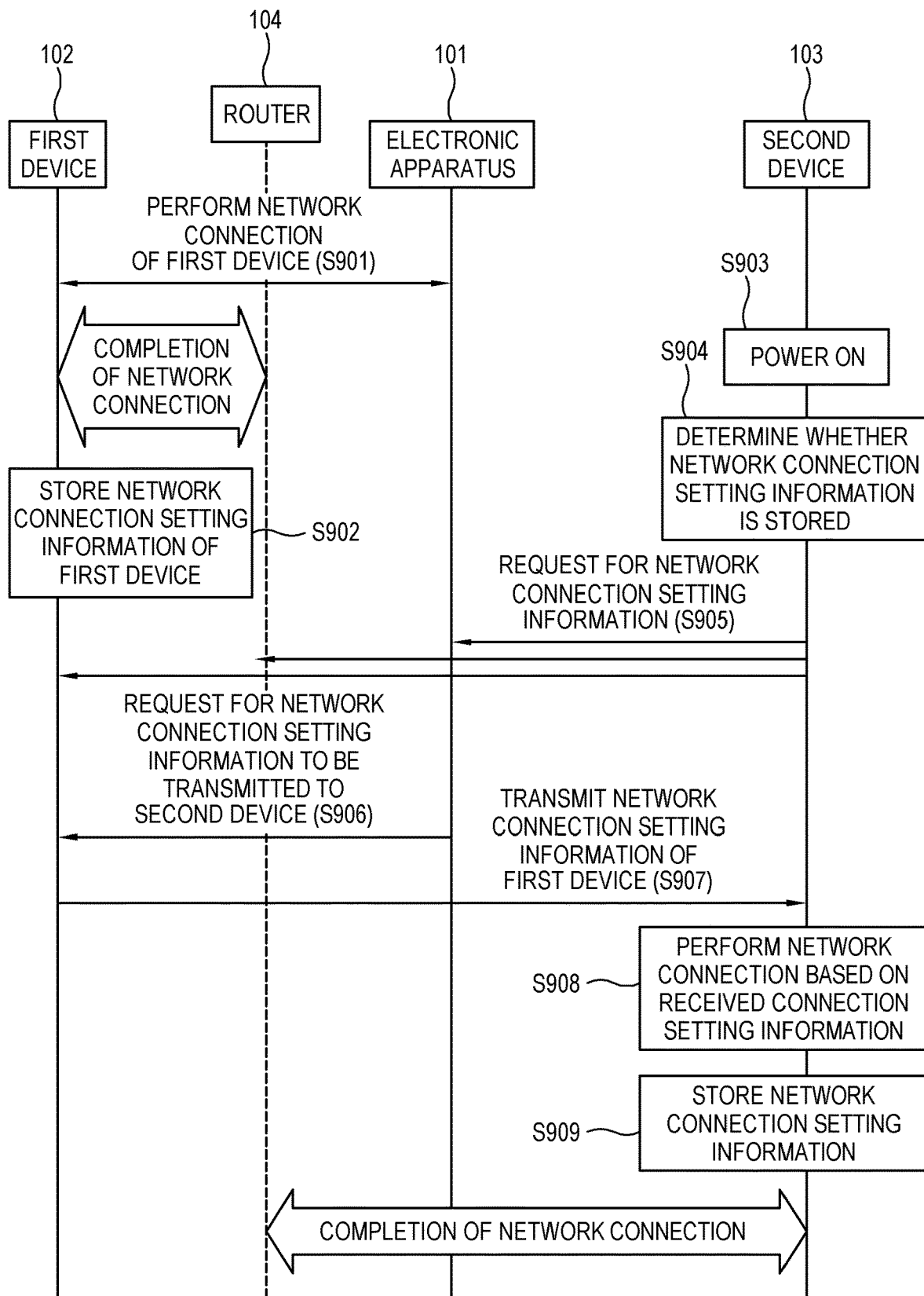
FIG. 9 is a view of showing operations among an electronic apparatus, a first device, and a second device according to a fifth embodiment.

In the first embodiment and the second embodiment, the electronic apparatus 101 stores the network connection setting information of the first device therein after performing the network connection with the first device 102, but the network connection setting information of the first device does not have to be stored in the electronic apparatus 101. Alternatively, the network connection setting information of the first device 102 may be stored in a separate server. Alternatively, the network connection setting information of the first device 102 may be not separately stored in the electronic apparatus 101 or the server, and the information stored in the first device 102 may be used as necessary. This is illustrated in FIGS. 7, 8, and 9.

Below, a third embodiment of storing the network connection setting information of the first device 102 in a separate server will be described with reference to FIG. 7. FIG. 7 is a view of showing operations among an electronic apparatus, a first device, and a second device according to a third embodiment.

The third embodiment is different from the first embodiment and the second embodiment in that the network connection setting information of the first device 102 is not stored in the electronic apparatus 101 but transmitted to and stored in a separate server 105 (S702, S703) after the electronic apparatus 101 performs the network connection with the first device 102 (S701). It is more advantageous to secure the security of the home network by storing the information in the server according to user accounts.

The network connection setting information of the first device 102, which has been stored in the server 105, is transmitted to the electronic apparatus 101 in response to a request from the electronic apparatus 101, and then transmitted again to the second device 103 (S704, S705) when the request for the network connection setting information is received from the second device 103 and the second device 103 is approved to use the network connection setting information of the first device 102.

The second device 103 of FIG. 7 makes the request for the network connection setting information by the same method as that of FIG. 4 or 5, but is not limited thereto. For example, as shown in FIG. 6, the second device 103 may be directly connected to the electronic apparatus 101 and directly makes a request for the connection setting information to the electronic apparatus 101. This is equivalently applied to embodiments of FIGS. 8, 9, and 10.

Below, a fourth embodiment, in which the network connection setting information of the first device 102 is not separately stored and the first device 102 is requested to transmit the information as necessary, will be described with reference to FIG. 8. FIG. 8 is a view of showing operations among an electronic apparatus, a first device, and a second device according to a fourth embodiment. Operations S801, S803, S804, S808, S809, and S810 are the same as those described above.

Unlike the first, second, and third embodiments, the network connection setting information of the first device according to the fourth embodiment is not separately stored in the electronic apparatus 101 or the server 105 but stored only in the first device 102 (S802) after performing the network connection with the first device 102. Then, when the request for the network connection setting information is received from the second device 103 (S805), the electronic apparatus 101 determines whether the second device 103 that has made the request for the network connection setting information is approved to use the network connection setting information of the first device 102, and receives the network connection setting information from the first device 102 (S807), thereby transmitting the information to the second device 103. FIG. 8 illustrates a method of determining whether the second device 103 is of the same type as the first device 102 as one among methods of determining whether the second device 103 is approved to use the network connection setting information of the first device 102. In other words, the electronic apparatus 101 makes a request for the network connection setting information to the first device 102 of the same type as the second device 103 that has made the request for the network connection setting information (S806), so that the network connection setting information of the first device 102 can be transmitted to the second device 103 only when the second device 103 is a device of the same type as the first device 102. However, the method of determining whether the second device 103 is a device approved to use the network connection setting information of the first device 102 is not limited to the foregoing method of determining whether it is of the same type. Alternatively, as long as it is determined that the second device 103 is a safe device to receive the network connection setting information of the first device 102, for example, it is determined that the second device 103 is a device capable of processing the network connection settings based on the network connection setting information of the first device 102, it does not matter that two devices are of different types from each other. Of course, the network connection setting information of the first device 102 may be transmitted to the second device 103 without any separate check.

In the foregoing case, the first device 102 may include firmware programmed to receive the request for the network connection setting information from the electronic apparatus 101 and recognize the content of the request, or may execute a separate application.

In this regard, without storing the network connection setting information of the first device 102 in the electronic apparatus 101, the network connection setting information of the first device may be used to easily perform the network connection with the second device. When the electronic apparatus 101 is a smart phone, the electronic apparatus 101 may be vulnerable to security attacks since it frequently communicates with the outside. In this case, the network connection setting information of the first device is used to easily perform the network connection with the second device without storing the network connection setting information of the first device in the electronic apparatus 101, thereby strengthening the security while keeping convenience of the network connection.

In the fourth embodiment, the network connection setting information stored in the first device 102 may be directly transmitted to the second device 103 without going through the electronic apparatus 101. In this regard, a fifth embodiment will be described with reference to FIG. 9. FIG. 9 is a view of showing operations among an electronic apparatus, a first device, and a second device according to a fifth embodiment. Operations S901, S902, S903, S904, S905, S908, and S909 are the same as those described above.

The fifth embodiment of FIG. 9 is the same as the fourth embodiment up to the operation (S906) in which the electronic apparatus 101 that has received the request for the network connection setting information from the second device 103 asks the first device 102 for the network connection setting information to be transmitted to the second device 103. However, according to the fifth embodiment, the first device 102 is requested to transmit the network connection setting information not to the electronic apparatus 101 but directly to the second device 103. Therefore, the first device 102 that has received the request for the network connection setting information from the electronic apparatus 101 transmits the network connection setting information stored therein to the second device 103 directly (S907).

There are various ways of transmitting the network connection setting information stored in the first device 102 to the second device 103. When the first device 102 and the second device 103 can be paired for direct communication between them, they are connected and exchange a packet based on the communication protocol of the connection. For example, when both the first device 102 and the second device 103 respectively include the Bluetooth communication module, they can be paired by Bluetooth. Alternatively, when the first device 102 and the second device 103 include only the Wi-Fi communication module, the first device 102 operates by SoftAP and then the first device 102 and the second device 103 are connected by a beacon signal transmitted from the first device 102. Besides, the first device 102 and the second device 103 may be connected by BLE, SPP, Wi-Fi Direct, infrared communication, near field communication (Zig bee), or the like communication method.

Although the first device 102 and the second device 103 are not connected for the direct communication between them, a packet to be transmitted from the first device 102 to the second device 103 may be generated to have a specific structure set by a manufacturer. Since the first device 102 has already been connected to the home network but the second device 103 has not been connected to the home network yet, there may be a need of generating and analyzing a packet having a separate structure for communication of exchanging the connection setting information between them. For example, when the packet to be transmitted is generated in the first device 102, the packet may be generated to include identification information about the second device 103, which is received from the electronic apparatus 101. In this case, there may be a need of separately installing firmware or executing an application in the first device 102 for generating a packet and the second device 103 for receiving the packet.

Thus, it is possible to directly transmit the network connection setting information from the first device to the second device without any intervention of the electronic apparatus 101, and the network connection settings for the second device are rapidly performed.

Figure 10:
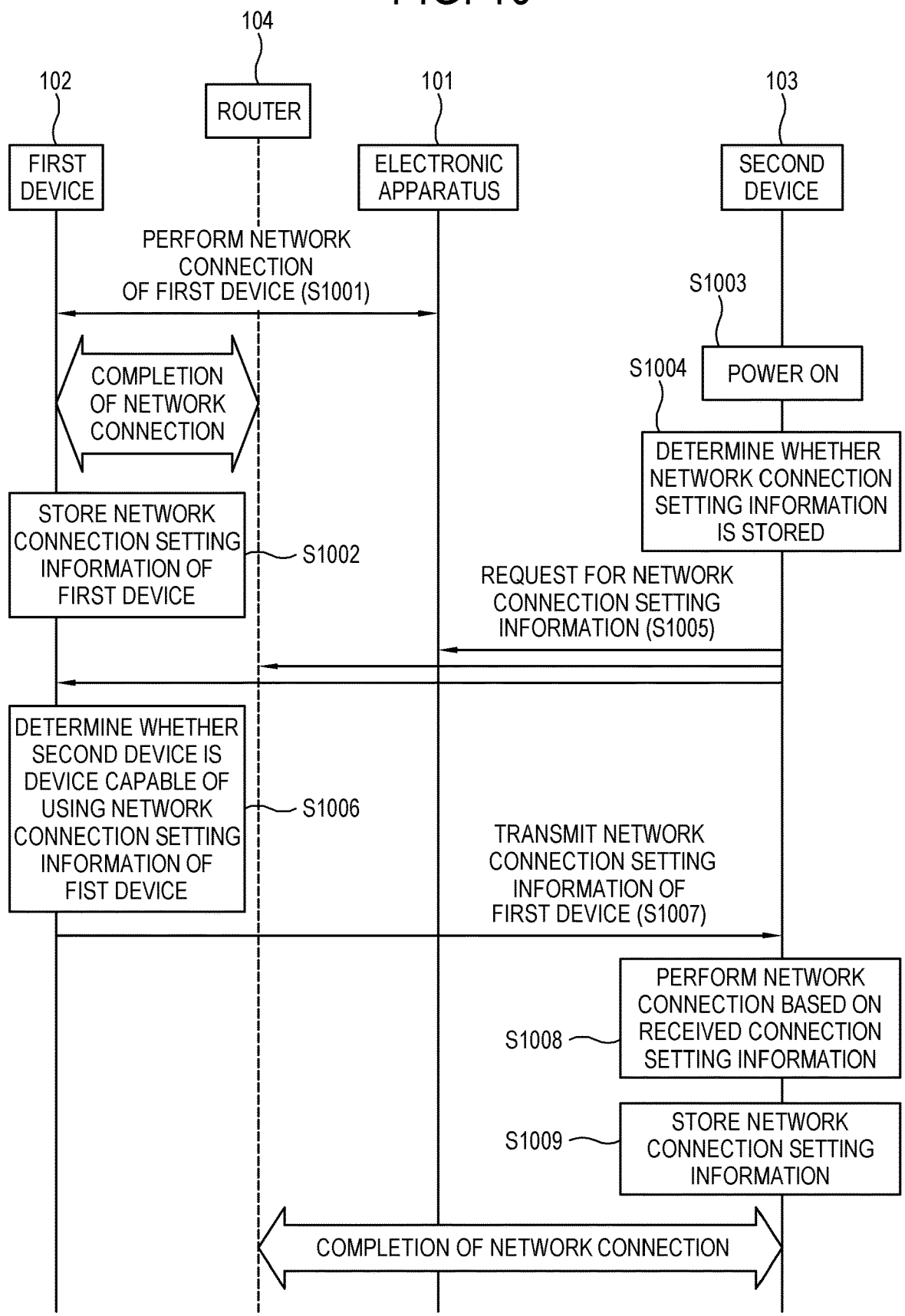
FIG. 10 is a view of showing operations among an electronic apparatus, a first device, and a second device according to a sixth embodiment.

In addition, the request and transmission for the connection setting information between the first device 102 and the second device 103 may be also performed without any intervention of the electronic apparatus 101 like the fifth embodiment. In this regard, a sixth embodiment will be described with reference to FIG. 10. FIG. 10 is a view of showing operations among an electronic apparatus, a first device, and a second device according to a sixth embodiment. Operations S1001, S1002, S1003, S1004, S1008, and S1009 are the same as those described above.

In the fifth embodiment described with reference to FIG. 9, the electronic apparatus 101 recognizes the request of the second device 103 for the network connection setting information, selects the first device 102 for providing the connection setting information, and makes the first device 102 transmit the network connection setting information stored therein to the second device 103.

On the other hand, in the sixth embodiment, as shown in FIG. 10, the first device 102 directly receives and recognizes the request for the network connection setting information from the second device 103 (S1005), determines by itself whether the second device is approved to use the network connection setting information of the first device (S1006), and transmits the network connection setting information of the first device 102 to the second device 103 in accordance with determination results (S1007). In other words, the first device 102 performs the operations of the electronic apparatus 101, and there are no needs of the intervention of the electronic apparatus 101. The request for the connection setting information may be made and the connection setting information may be transmitted between the first device 102 and the second device 103 by the same methods as described above.

Thus, although the electronic apparatus 101 is not present or the network connection setting information of the first device 102 is not stored in the electronic apparatus 101, the first device 102 can directly receive and process the request of the second device 103 for the connection setting information, thereby easily and rapidly performing the network connection of the home network device.

Figure 12:
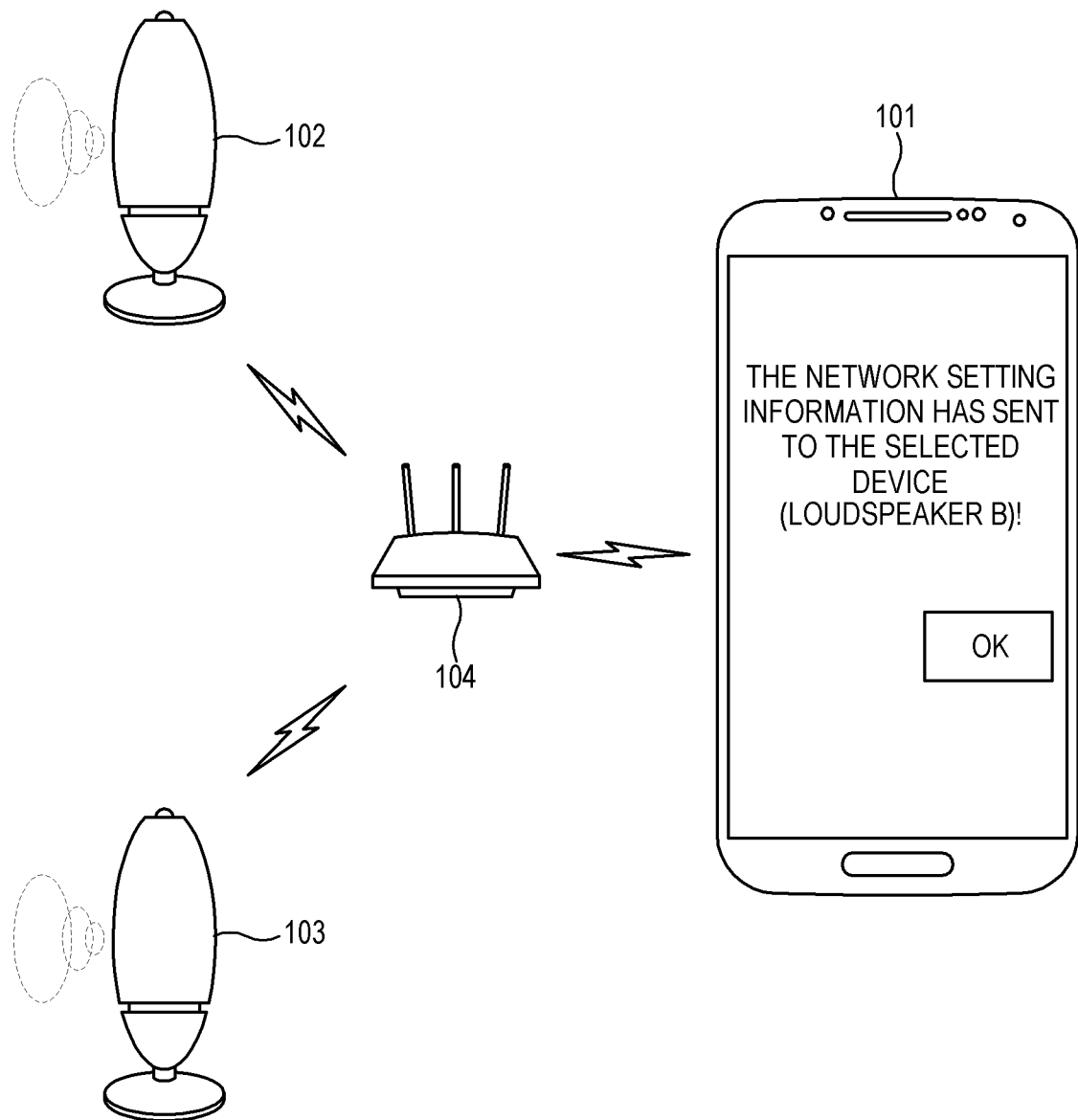
Figure 13:
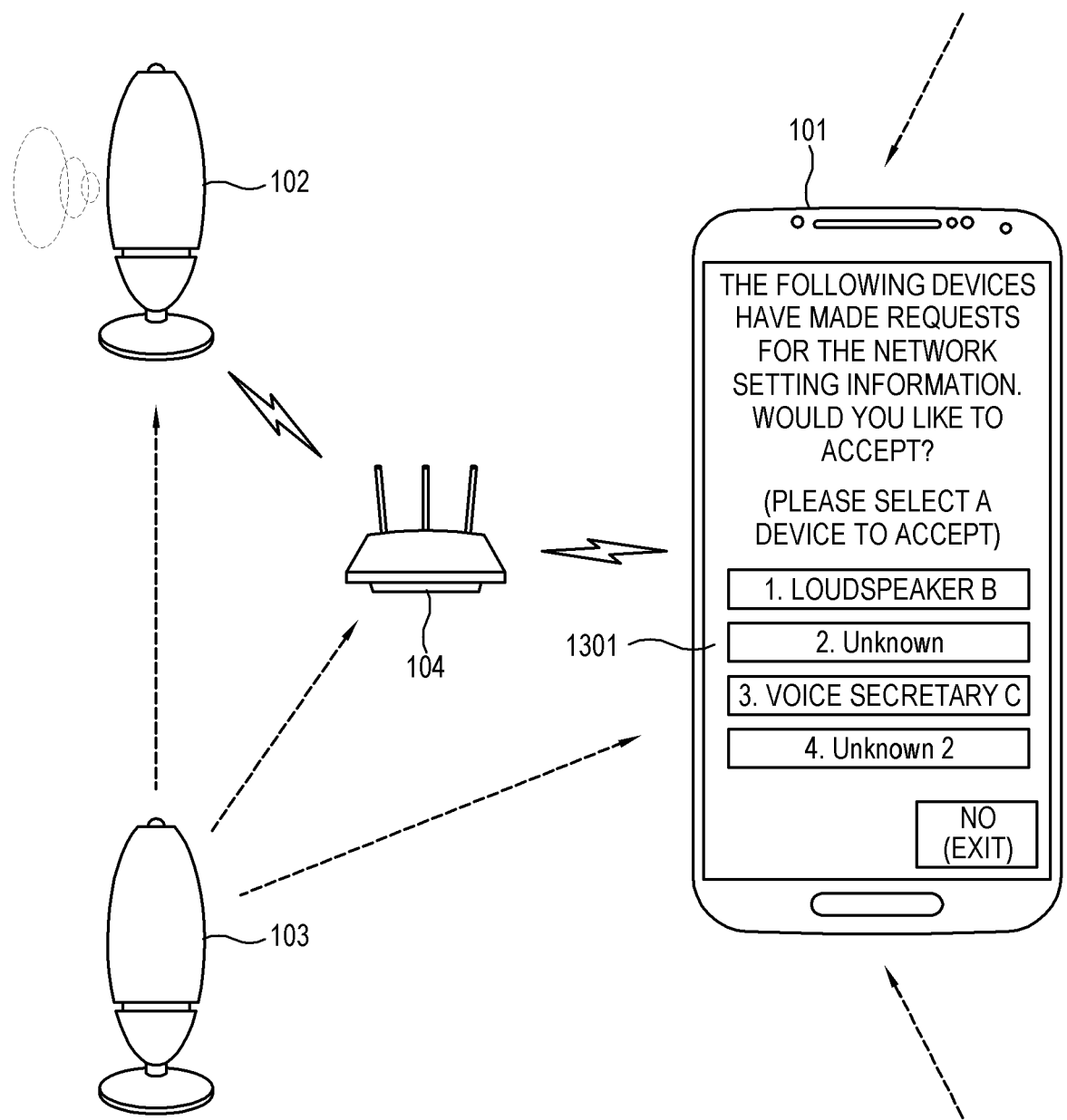
FIG. 13 is a view of showing other operations of a home network system and an electronic apparatus according to an embodiment.

Below, operations of the home network system and the electronic apparatus according to the embodiment and a user interface (UI) of the electronic apparatus will be described with reference to FIGS. 11, 12, and 13.

Figure 11:
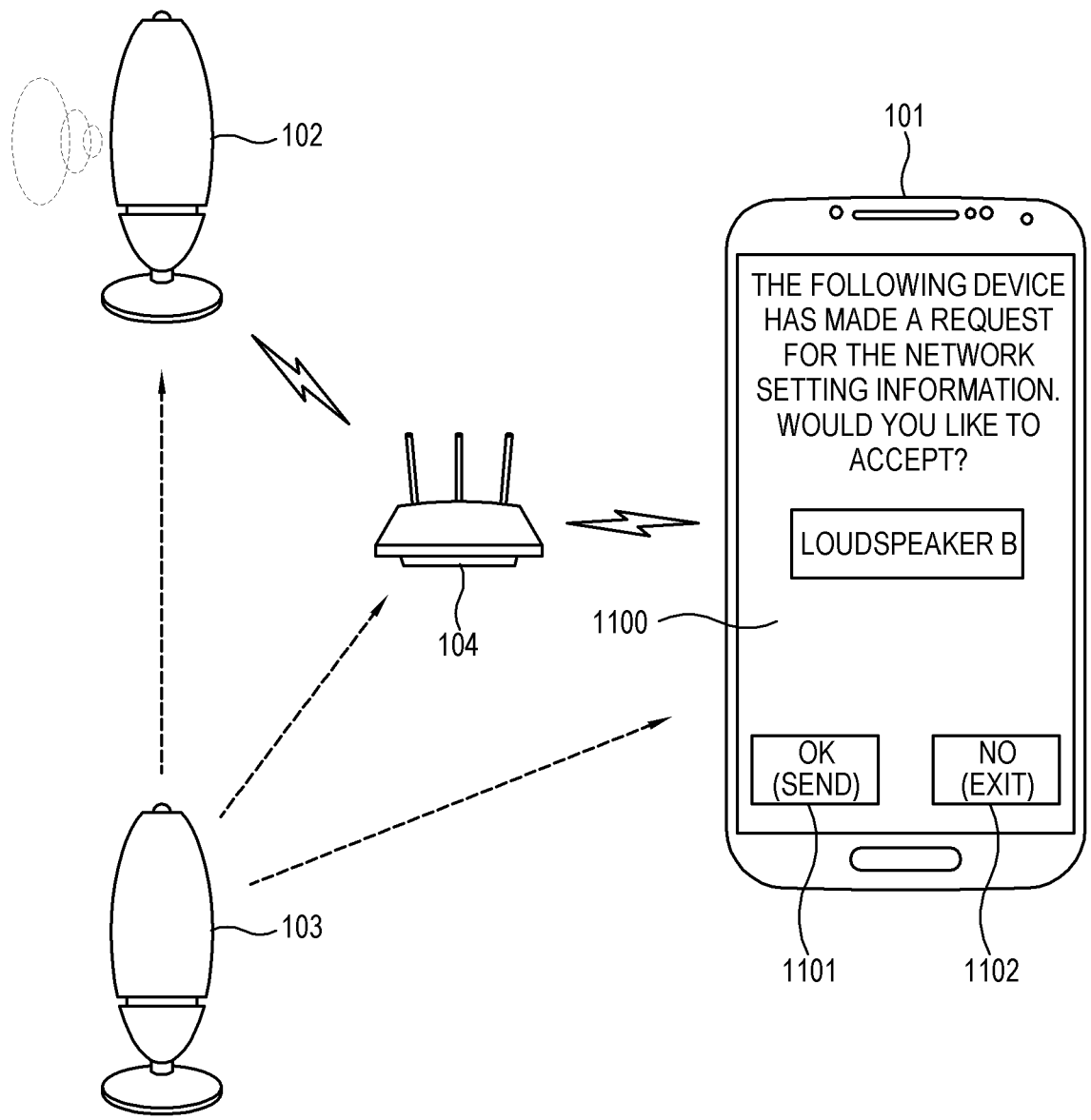
FIGS. 11 and 12 are views of showing operations of a home network system and an electronic apparatus according to an embodiment.

FIG. 11 illustrates that the second device 102, i.e. a loudspeaker B makes a request for the network connection setting information for connecting with the home network in a state that the first device 102, i.e., a loudspeaker A has already been connected to the home network and outputs music based on an audio signal generated in the electronic apparatus 101 and transmitted through the home network. In this case, the electronic apparatus 101 according to an embodiment receives the request, recognizes the device that has made the request, and displays a UI 1100 as shown in FIG. 11 on the display 113 so that a user can select whether to provide the network connection setting information to the device. Thus, the user grasps the kind of device, which has made the request for the network connection setting information, through the UI 1100 displayed on the display 113 of the electronic apparatus 101, and makes an input for determining whether to prove the network connection setting information to the device (1101, 1102).

When the user selects the device to which the network connection setting information will be transmitted (1101), the electronic apparatus 101 transmits the network connection setting information of the already connected first device 102 to the second device 103, and the second device 103 receives the connection setting information and performs the home network connection based on the received connection setting information. Then, as shown in FIG. 12, the second device 103 is also connected to the home network, and thus outputs the music based on the audio signal generated in the electronic apparatus 101 and transmitted via the home network like the first device 102.

Further, the electronic apparatus 101 according to the embodiment displays a list of home network devices, which have made requests for the network connection setting information, on the display 113 thereof when receives the requests for the network connection setting information from the plurality of home network devices (1301), thereby allowing a user to select at least one device, the request of which will be granted. This is illustrated in FIG. 13. The request for the network connection setting information may be received from the devices located outside the user's house. In this case, it may be impossible to exactly identify what device makes the request, or the information about the device may be not provided.

Figure 14:
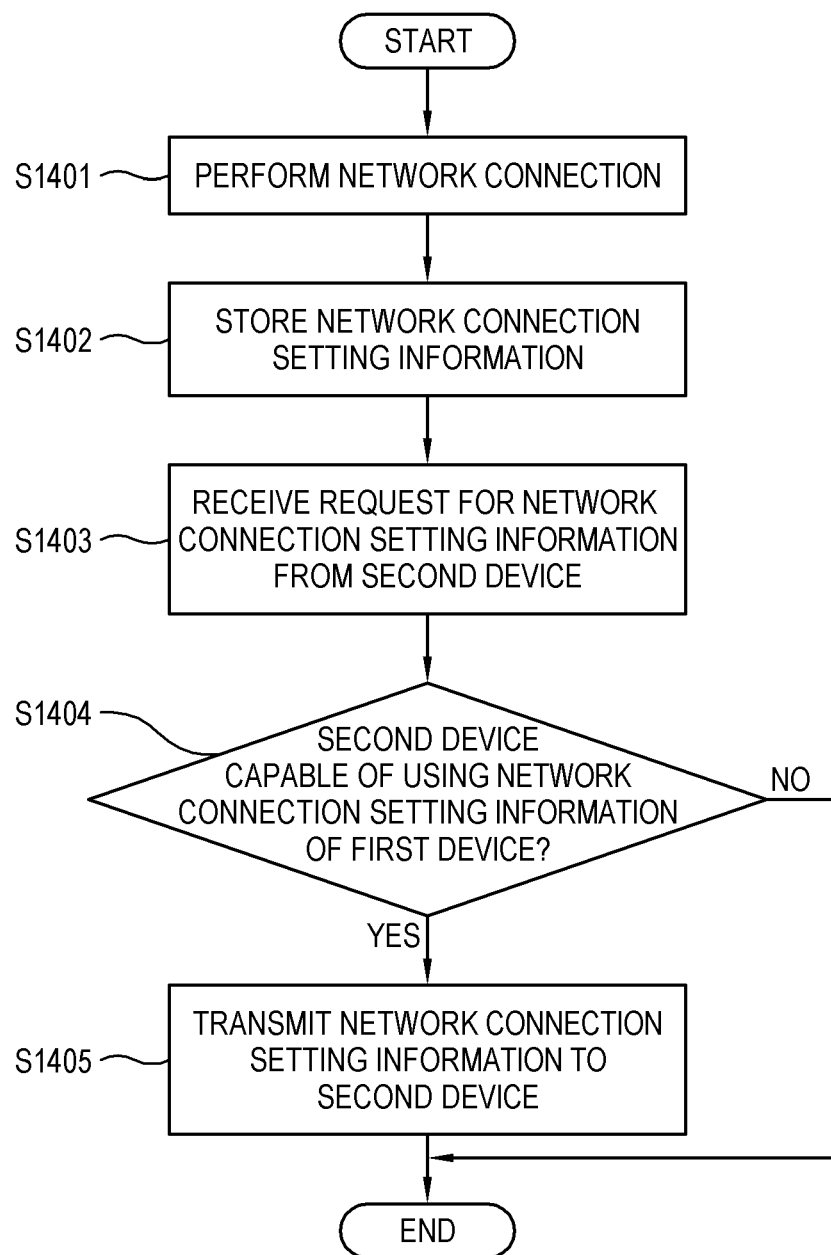
FIG. 14 is a view of showing a control method of a first device according to an embodiment.

FIG. 14 is a view of showing a control method of a first device according to an embodiment. The first device 102 according to an embodiment performs home network connection (S1401), and then stores the home network connection setting information (S1402). Then, when the request 103 for the network connection setting information is received from the second device (S1403), the first device 102 determines whether the second device 103 is a device approved to use the network connection setting information of the first device (S1404), and transmits the network connection setting information of the first device 102 to the second device 103 when it is determined the second device 103 is the approved device (S1405). On the other hand, when it is determined that the second device 103 is not the device approved to use the network connection setting information of the first device (S1404), the first device 102 does not transmit the network connection setting information to the second device 103. According to another embodiment, the first device 102 may transmit the connection setting information to the electronic apparatus 101 or the second device 103 in response to the request of the electronic apparatus 101 for the connection setting information, without determining whether the second device 103 is the device approved to use the network connection setting information of the first device.

Figure 15:
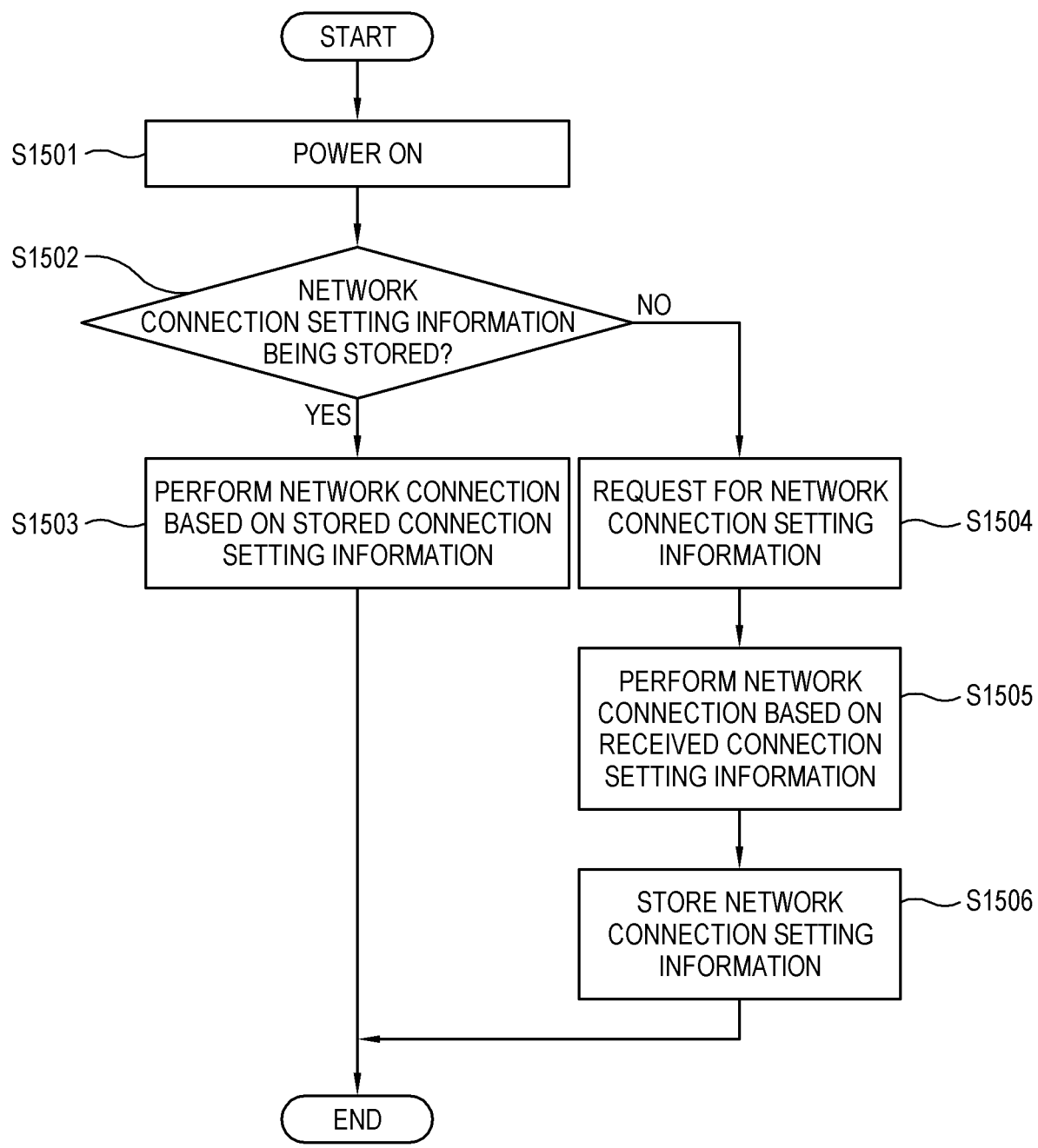
FIG. 15 is a view of showing a control method of a second device according to an embodiment.

FIG. 15 is a view of showing a control method of a second device according to an embodiment. According to an embodiment, when the second device 103 is turned on (S1501), the second device 103 determines whether the network connection setting information is stored therein or not (S1502). When the network connection setting information is stored in the second device 103, the second device 103 can be connected to the network based on the network connection setting information. On the other hand, when the network connection setting information is not stored in the second device 103, the second device 103 makes a request for the network connection setting information (S1504). When the network connection setting information is received by the request, the second device 103 performs the network connection based on the received connection setting information. Then, the received connection setting information or newly generated connection setting information may be stored in the second device 103 (S1506). According to another embodiment, when the second device 103 is turned on, it is determined whether the second device 103 is turned on for the first time or not. When the second device 103 is turned on for the first time, the request for the connection setting information may be made to receive the connection setting information, thereby performing the network connection based on the received connection setting information.

The foregoing embodiments may be all embodied by a computer program stored in a medium to combine with the electronic apparatus and realize the embodiments. The medium in which the computer program will be stored is not limited to a storing positon, method, format, etc. For example, the computer program may be stored in the storage 112 of the electronic apparatus 101 according to the disclosure, or may be stored in a medium separated from the electronic apparatus 101. Further, the computer program may be stored in a server. In this case, the computer program stored in the server may be downloaded to the electronic apparatus through the network. In terms of a storing method, any storing method is possible including a magnetic method, an electric method and an optical method. Thus, a magnetic tape, a magnetic drum, a floppy disk, a hard disk, a programmable read only memory (PROM), an erasable and programmable read only memory (EPROM), an electrically erasable and programmable read only memory (EEPROM), a flash-ROM, a compact flash (CF) Card, a memory stick, an SD card, a universal serial bus (USB) memory, a compact disc (CD)-ROM, CD-rewritable (RW), digital versatile disc (DVD)-ROM, DVD-RW, or the like may be used as the medium.

As described above, according to the disclosure, it is easy to connect the home network device to the home network while securing the security of the home network.

Further, according to the disclosure, when one home network device has ever been connected to the home network, the network connection setting information of the device may be used to facilitate settings of the device to be subsequently connected to the home network.

Although a few embodiments have been shown and described, it will be appreciated by a person having an ordinary skill in the art that various changes and modifications may be made in these embodiments. For example, the foregoing results may be properly achieved even though the described operations may be performed in different order, or the described system, structure, device, circuit or the like elements may be differently coupled, combined or replaced or exchanged with other elements or equivalents. Therefore, it will be understood that the present inventive concept is not limited to the foregoing embodiments and the accompanying drawings, and other achievements, other embodiments and equivalents belong to the appended claims. Further, the present disclosure is not construed as limiting the present inventive concept but provided for illustrative purposes.

What is claimed is:

1. An electronic apparatus comprising:
a wireless communication interface configured to wirelessly communicate with an access point, a first device, and a second device;
a memory configured to store network connection information of the first device for connecting with the access point; and
a processor configured to:
receive, from the second device, a wireless signal requesting the network connection information for connecting with the access point, and
based on determining that the second device is capable of using the network connection information of the first device, transmit the network connection information of the first device to the second device, by which the second device is able to connect with the access point.

2. The electronic apparatus according to claim 1, wherein the processor is configured to determine that the second device is capable of using the network connection information of the first device based on a user input allowing the second device to connect with the access point using the network connection information of the first device.

3. The electronic apparatus according to claim 1, wherein the wireless communication interface is configured to communicate through at least one of a Bluetooth signal, a Zigbee signal, a Wi-Fi signal, and an IEEE (Institute of Electrical and Electronics Engineers) 802.11 beacon signal.

4. The electronic apparatus according to claim 1, wherein the processor is further configured to receive the network connection information through the wireless communication interface from the first device.

5. The electronic apparatus according to claim 1, wherein the processor is further configured to transmit a signal to the first device, the signal requesting the first device to transmit the network connection information of the first device to the second device.

6. The electronic apparatus according to claim 1, wherein the network connection information comprises at least one of manufacturer information, a version, service providing option information, a packet number, a device type, connection information, a connection type, and an address.

7. The electronic apparatus according to claim 1, wherein the processor is further configured to:
transmit, to an external server, a signal requesting the network connection information of the first device, and
receive the network connection information through the wireless communication interface from the external server.

8. The electronic apparatus according to claim 2, further comprising a display;
wherein the processor is configured to display a list of devices on the display, wherein the devices include the second device requesting the network connection information of the first device for connecting with the access point.

9. A method of controlling an electronic apparatus capable of communicating with a first device and a second device, the method comprising:
storing network connection information of the first device for connecting with an access point;
receiving, from the second device, a wireless signal requesting the network connection information for connecting with the access point; and
based on determining that the second device is capable of using the network connection information of the first device, transmitting the network connection information of the first device to the second device, by which the second device is able to connect with the access point.

10. The method according to claim 9, further comprising; determining that the second device is capable of using the network connection information of the first device based on a user input allowing the second device to connect with the access point using the network connection information of the first device.

11. The method according to claim 9, wherein the receiving or the transmitting comprises receiving or transmitting by communicating with the first device or the second device through at least one of a Bluetooth signal, a Zigbee signal, a Wi-Fi signal, and an IEEE (Institute of Electrical and Electronics Engineers) 802.11 beacon signal.

12. The method according to claim 9, wherein the receiving comprises receiving the network connection information from the first device.

13. The method according to claim 9, further comprising: transmitting a signal to the first device, the signal requesting the first device to transmit the network connection information of the first device to the second device.

14. The method according to claim 9, wherein the network connection information comprises at least one of manufacturer information, a version, service providing option information, a packet number, a device type, connection information, a connection type, and an address.

15. The method according to claim 9, further comprising: transmitting, to an external server, a signal requesting the network connection information of the first device, and receiving the network connection information through a wireless communication interface from the external server.

16. The method according to claim 10, further comprising: displaying a list of devices on a display, wherein the devices include the second device requesting the network connection information of the first device for connecting with the access point.

17. The electronic apparatus according to claim 1, wherein the processor is configured to communicate with the first device and the second device through a first wireless communication interface, and to communicate with the access point through a second wireless communication interface, and wherein the first wireless communication interface comprises a Bluetooth communication module, and the second wireless communication interface comprises a Wi-Fi communication module.

\* \* \* \* \*